(12) United States Patent
Arakawa et al.

(10) Patent No.: US 8,562,020 B2
(45) Date of Patent: Oct. 22, 2013

(54) STEERING COLUMN SUPPORT APPARATUS

(75) Inventors: Tetsuo Arakawa, Gunma (JP); Hiroshi Fukuda, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/201,348

(22) PCT Filed: Jun. 13, 2011

(86) PCT No.: PCT/JP2011/063501
§ 371 (c)(1),
(2), (4) Date: Dec. 22, 2011

(87) PCT Pub. No.: WO2011/158787
PCT Pub. Date: Dec. 22, 2011

(65) Prior Publication Data
US 2012/0112443 A1 May 10, 2012

(30) Foreign Application Priority Data

Jun. 16, 2010 (JP) ................................ 2010-137584

(51) Int. Cl.
*B62D 1/19* (2006.01)
(52) U.S. Cl.
USPC ............................................ 280/777; 74/492
(58) Field of Classification Search
USPC ................................ 280/775, 777; 74/492, 493
See application file for complete search history.

(56) References Cited

U.S. PATENT DOCUMENTS

| 4,194,411 | A | * | 3/1980 | Manabe et al. | 74/492 |
| 4,998,999 | A | * | 3/1991 | Yuzuriha et al. | 280/777 |
| 5,704,641 | A | * | 1/1998 | Shimizu et al. | 280/775 |
| 5,899,116 | A | * | 5/1999 | Armstrong et al. | 74/492 |
| 6,394,494 | B1 | * | 5/2002 | Jurik et al. | 280/777 |
| 6,655,715 | B2 | * | 12/2003 | Anspaugh et al. | 280/777 |
| 6,685,225 | B2 | * | 2/2004 | Hancock et al. | 280/777 |
| 2003/0000330 | A1 | * | 1/2003 | Murakami et al. | 74/492 |

FOREIGN PATENT DOCUMENTS

| JP | 5216129 | 2/1977 |
| JP | 6020460 | 2/1985 |
| JP | 6237811 | 9/1987 |
| JP | 2004182216 | 7/2004 |

(Continued)

OTHER PUBLICATIONS

International Search Report and Written Opinion dated Sep. 13, 2011 from the corresponding PCT/JP2011/063501.

*Primary Examiner* — Ruth Ilan
*Assistant Examiner* — Timothy Wilhelm
(74) *Attorney, Agent, or Firm* — Katten Muchin Rosenman LLP

(57) ABSTRACT

Construction of a steering column support apparatus is achieved that is able to suppress an increase in the height dimension, maintain a function of the steering column 6a being able to displace smoothly in the forward direction during a secondary collision and prevent the steering column from dropping down even when the steering column 6a is displaced in the forward direction due to a secondary collision. The steering column support apparatus comprises a non-dropping bracket 45 that is fastened to the vehicle body, a dropping bracket 46 that is supported by the steering column 6a, a pair of bolts 47 and a pair of support capsules 16a. During a secondary collision, the supporting force of the support capsules 16a for supporting the non-dropping bracket 45 is lost and the steering column 6a displaces in the forward direction together with the bolts 47, support capsules 16a and dropping bracket 46, however, does not drop from the non-dropping bracket.

17 Claims, 16 Drawing Sheets

(56) References Cited

FOREIGN PATENT DOCUMENTS

| | | |
|---|---|---|
| JP | 2004338509 | 12/2004 |
| JP | 200553349 | 3/2005 |
| JP | 200596731 | 4/2005 |
| JP | 2005280654 | 10/2005 |
| JP | 2005343331 | 12/2005 |
| JP | 2006192971 | 7/2006 |
| JP | 4186059 | 11/2008 |
| JP | 2008265647 | 11/2008 |
| JP | 2008308072 | 12/2008 |
| JP | 2009154817 | 7/2009 |
| JP | 2009190447 | 8/2009 |

* cited by examiner

STEERING COLUMN SUPPORT APPARATUS

TECHNICAL FIELD

The present invention relates to the improvement of a steering column support apparatus that supports a steering column of a steering apparatus for applying a steering angle to the steered wheels of a vehicle.

BACKGROUND ART

A steering apparatus for a vehicle is an apparatus for arbitrarily changing the direction of travel of a vehicle; for example, as illustrated in FIG. 18, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9.

In the example in the figure, a tilting mechanism for adjusting the vertical position of the steering wheel 1, a telescoping mechanism for adjusting the forward/backward position and an electric-powered power steering apparatus, which uses an electric motor 10 as an auxiliary power source to make it possible to reduce the force required for operating the steering wheel 1, are integrated together. Of these, in order to construct the telescoping mechanism, the steering column 6 is constructed with an outer column 11 combined with and inner column 12 such that the columns can be extended and contracted freely in a telescopic shape, and the steering shaft 5 is constructed with an outer tube 13 and an inner tube 14 combined together by way of a spline fit or serration fit, such that torque can be freely transmitted, and such that the tube can be extended and contracted freely.

When a vehicle, in which the steering apparatus described above is assembled, is in a collision accident with another vehicle, after the initial collision of colliding with the other vehicle, the body of the driver may hit the steering wheel 1, causing a secondary collision. In order to lessen the impact to the driver's body by this second collision, the steering column 6 is supported by the vehicle body by way of a support capsule 16 and bolt 17 so that it drops when a large force is applied in the forward direction. Construction of this section has been widely known in the past such as disclosed in patent literature 1 to 4. FIG. 19 and FIG. 20 illustrate an example of the construction of a section that supports the steering column 6a with respect to the vehicle body that differs from the construction disclosed in the patent literature 1 to 4, however has been generally known.

In the conventional construction illustrated in FIG. 19 and FIG. 20, in order to achieve a tilting and telescoping mechanism that enable the adjustment of the vertical position and the forward/backward position of the steering wheel 1, the middle section of the steering column 6a is supported by a support bracket 18 via a tilting rod 19, and this support bracket 18 is supported by the vehicle body 15 so that it drops when a large force is applied in the forward direction. The support bracket 18 is formed into one piece by joining and fastening together a top plate 20 and a pair of left and right side plates 21, 21' through welding or the like, the top plate 20 and the side plates 21, 21' being obtained by bending a metal plate having sufficient strength and rigidity, such as steel plate, respectively.

The portions on both the left and right end sections of the top plate 20 that protrude further toward the left and right sides than the side plates 21, 21' function as installation plates 22 for attaching the support bracket 18 to the vehicle body 15 so that the support bracket 18 can drop down during a secondary collision. Cut out sections 23, which are open at the rear edge of the installation plate 22, are provided on each installation plate 22. Support capsules 16 are installed on the inside of each of the cut out sections 23. The support capsules 16 are formed by injection molding using synthetic resin, or by die cast molding using a light alloy. The support capsules 16 are supported by the installation plates 22 by fitting installation grooves 25, which are formed on the left and right side surfaces, with both side sections of the cut out sections 23 on part of the installation plate 22. Small through holes 26a that are formed in both side sections of the cut out sections 23 on part of the installation plates 22 are aligned with small through holes 26b that are formed in the support capsules 16, and the support capsules 16 are installed by injection molding or pressure fitting fastening pins (not illustrated in the figure), which are made of synthetic resin or a light alloy, into these small through holes so that they span the small through holes 26a in the installation plates 22 and the small through holes 26b in the support capsules 16. As a result, the support capsules 16 are supported by the installation plates 22 so that they drop down toward the rear from the installation plates 22 only when a large impact load is applied.

Moreover, in this conventional construction, in order to achieve a tilting and telescoping mechanism, the rear section of the inner column 12a on the front side and the front section of the outer column 11a on the rear side are fitted together in a telescopic shape, and by being able to be displaced in the axial direction, the steering column 6a can be extended or contracted. For the steering shaft 5a as well, the rear section of the inner shaft 14a on the front side and the front section of the outer shaft 13a on the rear side are fitted together so that the are able to displace in the axial direction and transmit torque. Of these, the outer shaft 13a is supported on the inside of the outer column 11a by a bearing such as a deep groove ball bearing that is able to support both radial loads and thrust loads so it can only rotate freely. The steering wheel 1 is supported and fastened to a portion of the rear end section of the outer shaft 13a that protrudes further toward the rear than the opening section on the rear end of the outer column 11a. On the other hand, the front end section of the inner column 12a is supported by the vehicle body so that it can pivot up or down around a horizontal shaft 32 (FIG. 18) that is inserted through the tip end section of a support arm 31 that is fastened to the reduction gear casing 30.

In order to be able to adjust the vertical position and the forward/backward position of the steering wheel 1, the front section of the outer column 11a is held between the side plates 21, 21' of the support bracket 18. The outer column 11a is made by die cast molding using a light alloy, and a held section 33 is provided on the bottom surface of the front section thereof such that it protrudes downward. A slit section 34 is provided in the center section in the width direction of this held section 33, and is such that the diameter of the front section of the outer column 11a can elastically expand or contract. With the slit section 34 held, a pair of long telescopic holes 35 that are long in the axial direction of the outer column 11a are formed in the both sides of the held section 33 such that they are aligned with each other. Furthermore, long tilt holes 36a, 36b that are long in the vertical direction are formed in the side plates 21, 21' in a partial arc shape with the horizontal shaft 32 as the center and are such that they are aligned with each other. With the long tilt holes 36a, 36b and the long telescopic holes 35 crossing each other, a tilt rod 1 is inserted through these long holes.

The tilt rod 19 is such that a pair of flat sections that are formed on part of both sides in the width direction of the outer circumferential surface of an outward facing flange shaped rim section 37 that is provided on the base end section (right end in FIG. 20) engages with the edge on the side of the long tilt hole 36a. Therefore, the tilt rod 19 does not rotate around its own center axis, however, it can be freely raised or lowered along the long tilt holes 36a, 36b. Moreover, the outer column 11a can displace in the forward or backward direction with respect to the support bracket 18 on which the tilt rod is placed, within a range in which the tilt rod 19 can displace inside the long telescopic holes 36 on both sides. Between the nut 38 that is fastened to the tip end section (left end section in FIG. 20) of the tilt rod and the outside surface of one of the side plates 21' (side plate on the left in FIG. 20) there is arranged in order from the nut side a thrust bearing 39, the base end section of an adjustment lever 40, and a cam mechanism 41. Of the pair of cam plate elements 42a, 42b of this cam mechanism 41, with the rotation of the cam plate element 42a that faces the one side plate 21' being stopped by engaging with the edge on the side of the long tilt hole 36b that is formed in this side plate 21', the cam plate element 42a can be raised or lowered along this long tilt hole 36b. The other cam plate element 42b is engaged to the base end section of the adjustment lever 40 so that relative displacement with respect to this base end section is prevented, this cam plate element 42b rotates as the adjustment lever 40 pivots, and by engaging with the other cam plate element 42a, the thickness in the axial direction of the cam mechanism 41 is expanded or reduced.

When this kind of steering apparatus is installed in a vehicle body, the support bracket 18 is supported by the vehicle body by bolts or studs that are inserted through holes 43 that are formed in the support capsules 16. When adjusting one or both of the vertical position and forward/backward position of the steering wheel 1, the thickness in the axial direction of the cam mechanism 41 is reduced by pivoting the adjustment lever 40 in a specified direction. As a result, the space between the pair of side plates 21, 21' of the support bracket 18 expands, and the diameter of the outer column 11a expands. In this state, it is possible to adjust the vertical position of the steering wheel 1 within a range in which the tilt rod 19 can displace along the long tilt holes 36a, 36b. It is also possible to adjust the forward/backward position of the steering wheel 1 within a range in which the tilt rod 19 can displace inside the long telescopic holes 35. After the steering wheel 1 has been moved to a desired location with the thickness of the cam mechanism 41 reduced in the axial direction, the adjustment lever 40 is pivoted and displaced in the opposite direction. As a result, the thickness of the cam mechanism 41 expands in the axial direction, and together with the space between the side plates 21, 21' being reduced, the diameter of the outer column 11a is reduced, and the steering wheel 1 is held in the adjusted position. A balance spring 44 is provided between the support bracket 18 and the tilt rod 19 and supports the weight of the portion that is raised or lowered with the tilt rod 19, such that, during adjustment of the position of the steering wheel 1, the need for a large force for supporting the steering wheel 1 is eliminated.

During a secondary collision, when a strong force is applied in the forward direction to the steering column 6a from the steering wheel 1, the fastening pins that span the small through holes 26a in the installation plates 22 and the small through holes 26b that are formed in the support capsules 16 are sheared. With the support capsules 16 stopped as is in that position, the installation plates 22 displace forward, and the support capsules 16 drop to the rear from the cut out sections 23. As a result of this, the steering wheel 1 is allowed to displace in the forward direction, which lessens the impact that is applied to the body of the user that collided with the steering wheel 1.

In the case of this conventional construction, in the state after the support capsules 16 have dropped to the rear from the cut out sections 23 due to a secondary collision, the vehicle body 15 no longer supports the steering column 6a. In this state, the position of the steering wheel 1 is not set, and it becomes difficult for the steering wheel 1 to apply an adequate steering angle to the steered wheels. Depending on the extent of the collision accident, there is a possibility that even after the support force for supporting the steering column 6a by the vehicle body 15 is lost, regardless of whether the vehicle can or cannot move on its own, the vehicle may have to be moved out of the way by pushing it to the shoulder of the road. In that case, not being able to adequately steer the vehicle using the steering wheel 1 is not preferable.

In regards to this, patent literature 5 discloses construction in which, by inserting an impact absorbing member that is provided on the steering column side in the front and rear direction thereof between members that are fastened to the vehicle body, dropping of the steering column in the downward direction can be prevented even though the steering wheel is displaced in the forward direction due to a secondary collision. However, in this kind of construction, in the state after a secondary collision, the steering column is suspended by way of the impact absorbing member, so construction is complex, and not only does the height dimension (dimension in the vertical direction) of the steering column increase, but after a secondary collision, it is feasible that the supporting rigidity of the steering column will be considerably less than in the normal state. Also, during a secondary collision, often the body of the driver applies a force to the steering column in a direction that causes the steering column to tilt, however, in such a case, relative displacement between the impact absorbing member and the member fastened to the vehicle body is not performed smoothly, and thus the displacement of the steering column in the forward direction is not performed smoothly and there is a possibility that part of these members will become broken.

Patent literature 6 discloses construction in which, by way of a slider provided on the steering column side and a guide rail provided on the vehicle body side, the steering column is suspended such that it can slide in the axial direction. With this kind of construction as well, it is possible to prevent the steering column from dropping down after a secondary collision. However, the construction disclosed in patent literature 6 is even more complex than the construction disclosed in patent literature 5, and it is feasible that the height dimension of the steering column will increase. Moreover, when a force is applied in a direction causing the steering column to tilt, it is possible that the same problem will occur as in the construction disclosed in patent literature 5.

RELATED LITERATURE

Patent Literature

[Patent Literature 1] Japanese Patent Application Publication No. 2004-182216

[Patent Literature 2] Japanese Patent Application Publication No. 2004-338509
[Patent Literature 3] Japanese Patent Application Publication No. 2005-53349
[Patent Literature 4] Japanese Patent Application Publication No. 2005-96731
[Patent Literature 5] Japanese Patent Application Publication No. 2005-280654
[Patent Literature 6] Japanese Patent Application Publication No. 2006-192971

SUMMARY OF THE INVENTION

Problem to be Solved by the Invention

In consideration of the problems described above, it is the object of the present invention to provide a steering column support apparatus having construction that is capable of suppressing an increase in the height dimension and maintaining the function of smooth forward displacement of the steering column during a secondary collision, as well as is capable of preventing the steering column from dropping down even when the steering column is displaced forward together with the steering wheel due to a secondary collision.

Means for Solving the Problems

The steering column support apparatus of the present invention comprises a non-dropping bracket, a dropping bracket, a pair of connection members and a pair of support capsules.

Of these, the non-dropping bracket is fastened to and supported by the vehicle body and is located on the upper part of the middle section in the axial direction of the steering column, and comprises a top plate and a pair of long holes. The top plate is provided in the axial direction of the steering column. The long holes are formed in part of that top plate such that the holes are parallel to each other and extend in the axial direction of the steering column.

The dropping bracket is supported by the middle section in the axial direction of the steering column. This dropping bracket comprises a bottom plate and a pair of installation holes. The bottom plate is provided such that top surface faces the bottom surface of the top plate. The installation holes are formed in part of the bottom plate in locations that are aligned with the rear end sections of the long holes.

The support capsules are fastened to the non-dropping bracket in the rear end sections of the long holes in the non-dropping bracket, and are capable of displacing in the forward direction along the long holes due to an impact load in the forward direction that is applied to these support capsules. Therefore, for example, fastening pins that can be sheared off by an impact load in the shear direction span fastening holes that are formed in the support capsule and top plate in alignment with each other. The support capsules are such that they do not come out from the long holes in the thickness direction (vertical direction) of the top plate.

Furthermore, the dropping bracket is connected to the support capsules by inserting the connection members through the installation holes and through holes that penetrate through the support capsules in the vertical direction.

In the case of the steering column support apparatus of the present invention as described above, the support capsules comprise: a guide section having a width dimension that is a little less than the width dimension of the long holes, and that engages with the long holes so that the support capsules can displace in the forward or backward direction; and a rim section that has a width that is greater than the width of the long holes. By installing the rim section and the bottom plate to the top plate on both side sections of the long holes in the thickness direction of the top plate, the support capsules are able to displace along the long holes, and are prevented from coming out from the long holes in the thickness direction of the top plate.

When embodying the present invention, the connection member can comprise a bolt that is inserted from top to bottom through the through hole and installation hole, and a nut that is located on the bottom surface of the bottom plate that screws onto the bolt.

Alternatively, the connection member can comprise a stud that is inserted from bottom to top through the installation hole and through hole, the bottom end section thereof being supported by the bottom surface of the bottom plate, and the top end section protruding upward further than the top surface of the support capsule, and a nut that screws onto the top end section of the stud.

Moreover, alternatively, the connection member can comprise a connection pin that is inserted from bottom to top through the installation hole and through hole, the bottom end section thereof being supported by the bottom surface of the bottom plate, and the top end section protruding upward further than the top surface of the support capsule, and a retaining ring that is fastened to the top end section of the connection pin.

Furthermore, alternatively, the through hole of the support capsule can be constructed such that the cross-sectional area of the upper portion is greater than the cross-sectional area of the lower portion; the connection member can be a column shaped member that is formed by injection molding of synthetic resin in the installation hole and through hole such that the column shaped member spans the installation hole and through hole; and an outward facing flange second rim section can be formed on the bottom end section of the column shaped member in the portion that protrudes further downward than the bottom surface of the bottom plate, such that the top plate is held between this second flange section and the portion on the top end section of the column shaped member that is inside the upper portion of the through hole.

When embodying the present invention, preferably the support capsules are made of a light alloy such as an aluminum alloy, and the fastening pins are made of a light alloy or a synthetic resin. Light alloy fastening pins can be mounted inside the fastening holes by driving pin shaped members into the fastening holes. Synthetic resin fastening pins can be mounted inside the fastening holes by injection molding of a thermoplastic synthetic resin in each of the fastening holes.

Alternatively, preferably the support capsules are made of a synthetic resin. In that case, the support capsules are injection molded together with the fastening pins. In other words, the portion of the top plate of the non-dropping bracket that is near the rear end section of the long holes, and the bottom plate of the dropping bracket are set inside an injection molding cavity, after which synthetic resin is fed into this cavity and insert molding is performed.

Effect of the Invention

The steering column support apparatus of the present invention constructed as described above, is able to suppress an increase in the height dimension, maintain a function of the steering column being able to displace smoothly in the forward direction during a secondary collision and prevent the steering column from dropping down even when the steering column is displaced together with the steering wheel in the forward direction due to a secondary collision.

DESCRIPTION OF EMBODIMENTS OF THE INVENTION

Embodiment 1

Figure 18:
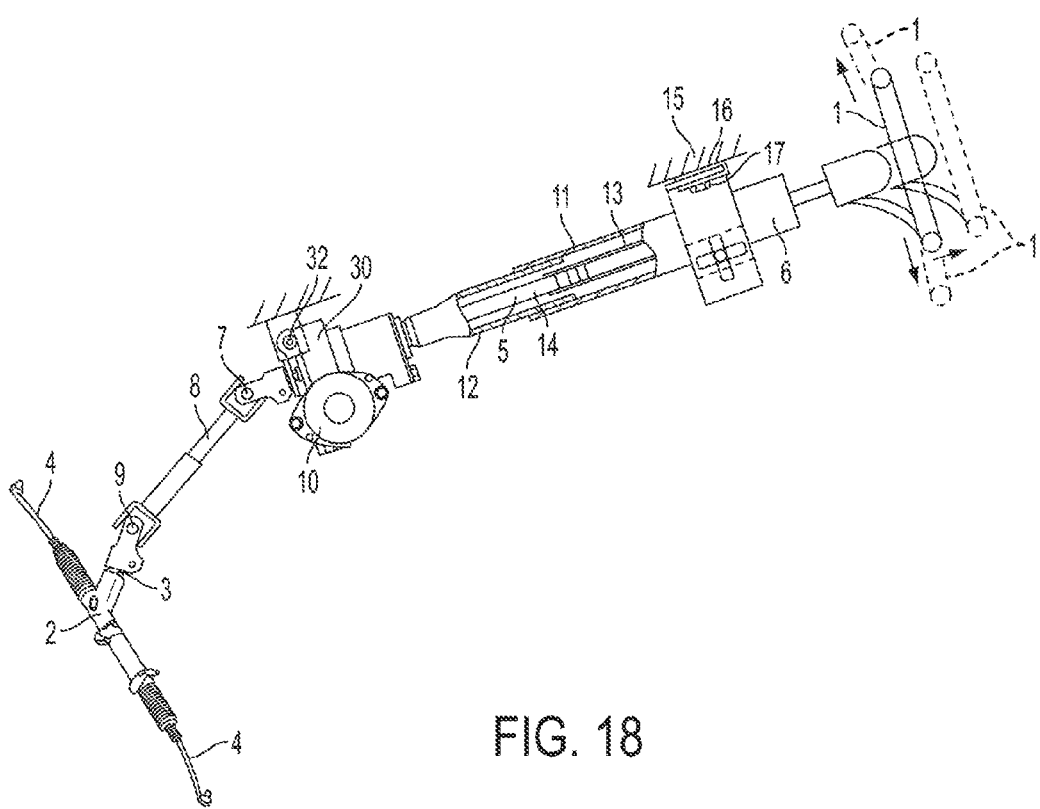
FIG. 18 is a side view illustrating the overall construction of a conventional steering apparatus.
Figure 19:
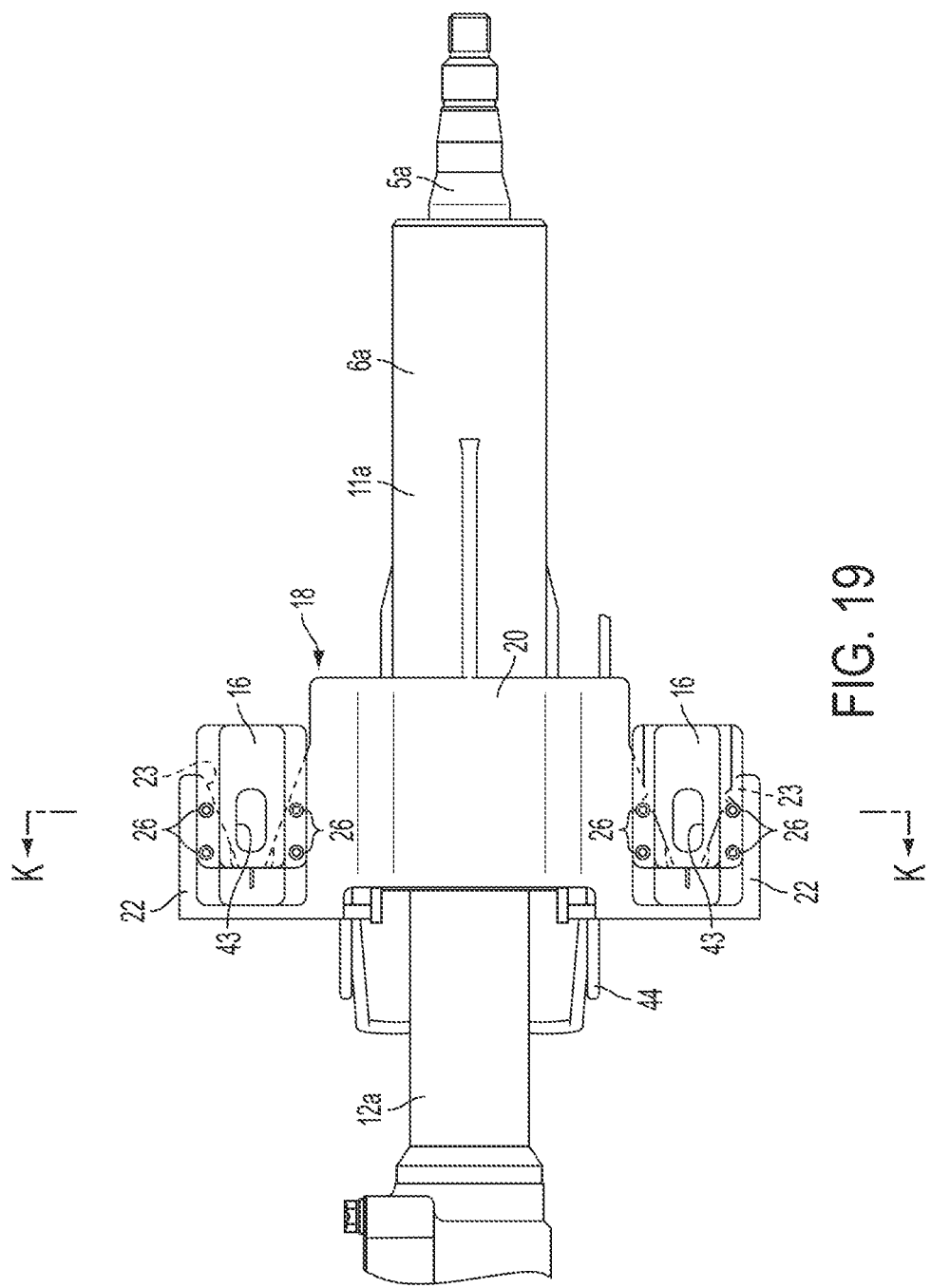
FIG. 19 is a top view illustrating a first example of conventional construction of a support apparatus for a steering column support apparatus.
Figure 20:
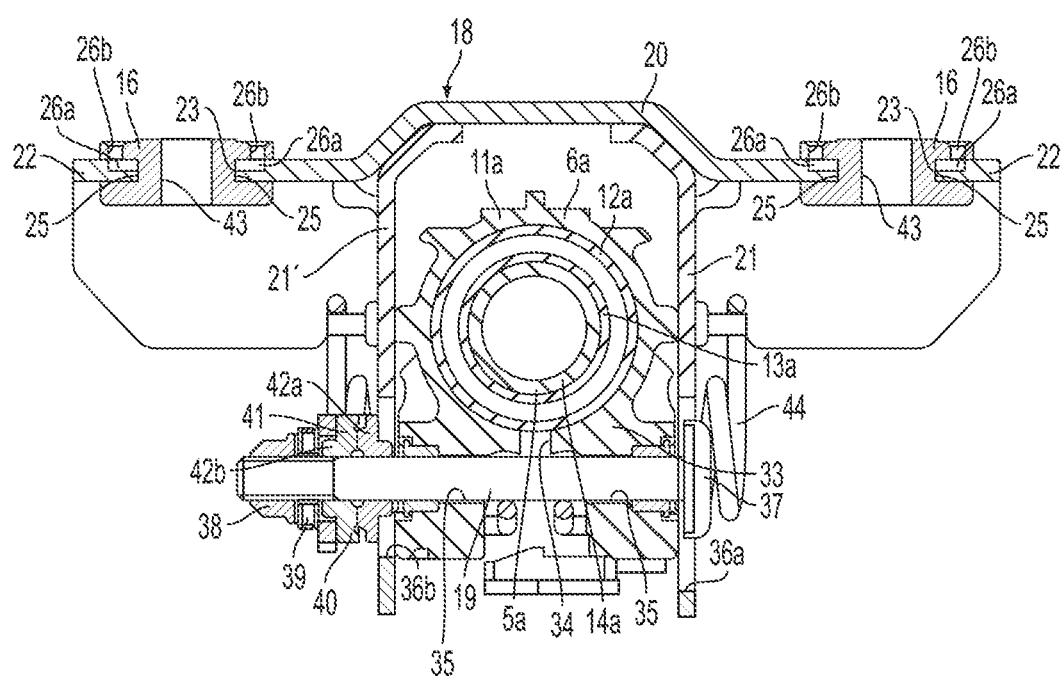
FIG. 20 is a cross-sectional view of section K-K in FIG. 19.

FIG. 1 to FIG. 10 illustrate a first embodiment of the present invention. A feature of the present invention, including this embodiment, is construction that makes possible forward displacement of an outer column 11a of a steering column 6a with respect to a vehicle body due to a forward impact load during a secondary collision, and that supports the steering column 6a in a state able to prevent the steering column 6a from dropping downward even after forward displacement. The construction and function of other parts of the steering apparatus are the same as in the conventional construction explained using FIG. 18 to FIG. 20, so the same reference numbers are given to identical parts and any redundant explanation is simplified or omitted, with the explanation below centering on the characteristic features of this embodiment.

The support apparatus for a steering column of this embodiment comprises: a non-dropping bracket 45, a dropping bracket 46, a pair of bolts 47 as connection members, and a pair of support capsules 16a.

Of these, the non-dropping bracket 45 is formed by pressing metal plate, such as steel plate, having sufficient strength and rigidity, and comprises a pair of left and right top plates 48, 48' and a connection plate 49 that connects the rear half sections of the top plates 48, 48' together. The edges around these top plates 48, 48' are bent downward, and together with the top plates 48, 48' having a high section modulus, sufficient bending rigidity is maintained. One long hole 50 and one through hole 51 are formed in each top plate 48, 48'. In other words, a pair of long holes 50 and a pair of through holes 51 are provided in the left and right top plates 48, 48'. The non-dropping bracket 45 is located at the top of the middle section in the axial direction of the steering column 6a, and is fastened to and supported by the vehicle body in the portion underneath the dashboard by a bolt or stud (not illustrated in the figures) that is inserted through the through hole 51. In this state, the top plates 48, 48' protrude from the left and right sides of the steering column 6a, and are arranged in the axial direction of the steering column 6a. Moreover, in this state, the long holes 50 are located on both the left and right sides of the steering column 6a, and being parallel to each other, extend from a portion near the rear end section of the center portion toward the front end section. In the example in the figure, the long holes 50 are formed as closed holes on the inside of the top plate 48, however, due to processing conditions, the edge on the end of the top plate 48 and the long holes 50 can be connected by a thin groove, and the long holes 50 can, for example, be formed as open holes on the front side of the top plate 48.

Figure 1:
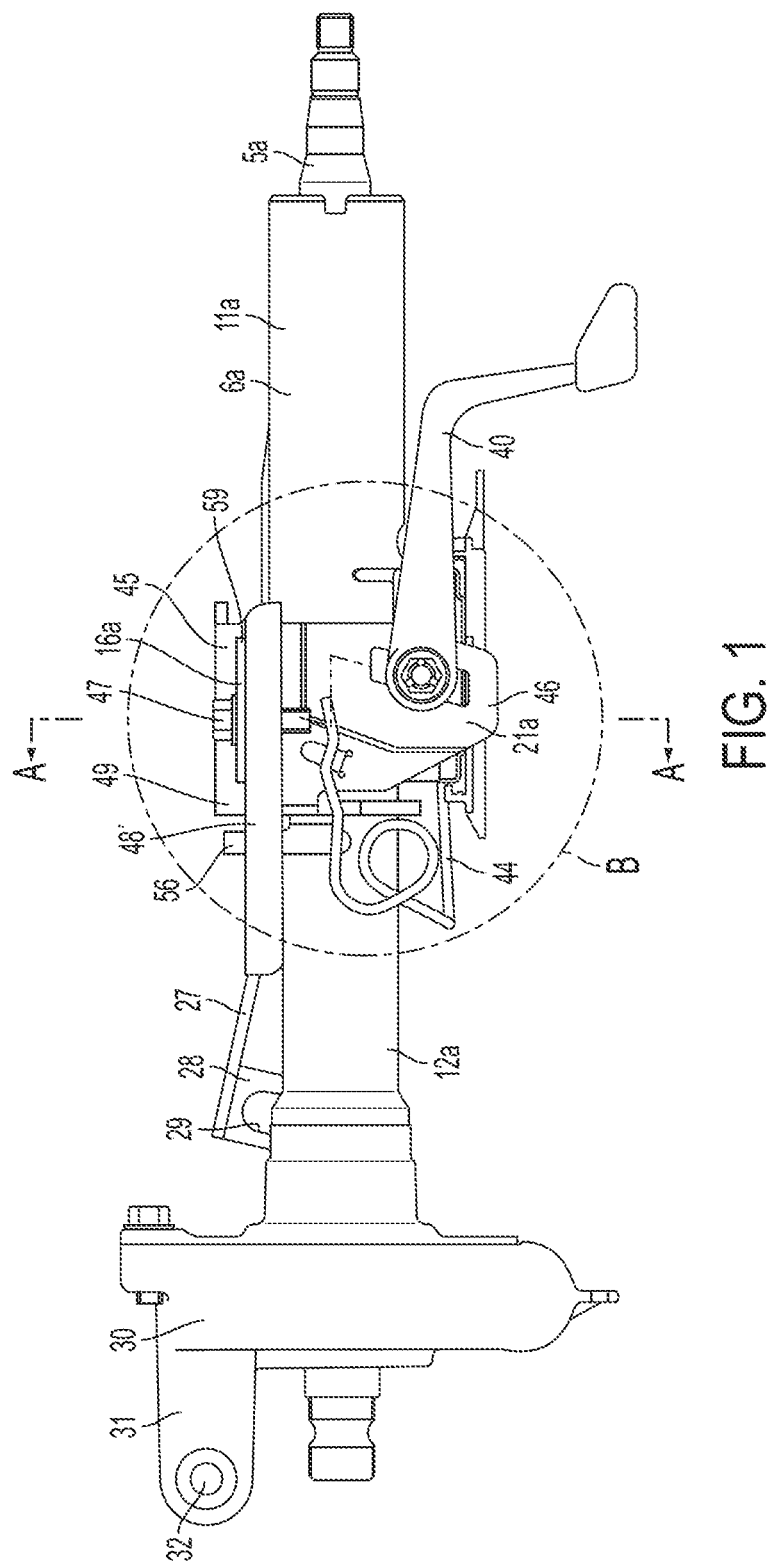
FIG. 1 is a side view of a first embodiment of the present invention, and illustrates the state before a secondary collision.

A fastening pin section (not illustrated in the figures) that protrudes from the side surface of the reduction gear casing 30 to the rear in FIG. 1 fits in a fastening hole 29 that is formed on a fastening plate 28 that is provided on the tip end section of a connecting arm section 27 that extends forward from the front end section of one of the top plates 48. Before the steering apparatus is installed in the vehicle, the outer column 11a is such that it cannot come apart from the inner column 12a even when the adjustment lever 40 is in a loosened state.

Moreover, the support capsules 16a are located at the rear end section of the long holes 50 so that forward displacement along the long holes 50 due to an impact load in the forward direction that is applied to the support capsules 16a is possible. Therefore, in this embodiment, fastening pins 53 that can be sheared off by an impact load in the shear direction span fastening holes 52a and fastening holes 52b that are formed in the support capsule 16 and top plate 48 in alignment with each other, and further span the fastening holes 52a of the support capsule 16a and concave sections 62 that are formed in the top plate 48 on both sides in the width direction of the rear end section of the long hole 50. In this embodiment, these fastening pins 53 are made of synthetic resin, and with the fastening holes 52a and the fastening holes 52b as well as the fastening holes 52a and the concave sections 62 being aligned with each other, can be formed by injection molding in which thermoplastic resin is injected into the fastening holes 52a, 52b and concave sections 62 and hardened. Moreover, fastening pins 53 that are formed beforehand can be fitted by pressing the fastening pins 53 between the fastening holes 52a and fastening holes 52b, and between the fastening holes 52a and the concave sections 62.

On the other hand, the dropping bracket 46 corresponds to the support bracket 18 that was installed in the conventional construction (FIG. 19 and FIG. 20) and is formed by joining and fastening a plurality of members, which have been formed by bending metal plate, such as steel plate, having sufficient strength and rigidity, by spot welding or the like. The bracket 46 comprises a pair of bottom plates 54 and side plates 21a on both the left and right, and a pair of installation holes 55 that are formed in these bottom plates 54. These bottom plates 54 are connected so that they cannot be separated by a connection section 56 that is provided further on the front side section than the connection plate 49 of the non-dropping bracket 45. This kind of dropping bracket 46 is supported by the front end section of the outer column 11*a* of the steering column 6*a* in the middle section in the axial direction of the steering column 6*a*. In this embodiment, in order to construct a tilting mechanism and telescoping mechanism for adjusting the vertical position and forward/backward position of the steering wheel (FIG. 18), the dropping bracket 46 is supported by the front end section of the outer column 11*a* such that the vertical position and forward/backward position can be adjusted as in the conventional construction illustrated in FIG. 19 and FIG. 20.

With this kind of dropping bracket 46 installed in the middle section of the steering column 6*a*, the bottom plate 54 protrudes further to both the left and right sides than the steering column 6*a*. Moreover, with the top surfaces of the bottom plate 54 facing the bottom surface of the top plate 48 of the non-dropping bracket 45, the bottom plate 54 is connected to the top plate 48 by way of the support capsules 16*a* and bolts 47. In order for this, in this embodiment, a nut 57 is fitted and supported in the opening section on the bottom side of the installation hole 55, and the bolt 47 that is inserted from the top to the bottom through the through hole 43*a* in the capsule 16*a* and installation hole 55 is screwed into the nut 57 and tightened. The positions of the installation holes 55 in the dropping bracket 46 and the positions of the bolts 47 that are inserted in this installation holes 55 are preferably in nearly a straight line in the width direction of the vehicle with the position of the through holes 51 for fastening the non-dropping bracket 45 to the vehicle body by way of bolts or the like. This construction improves the rigidity of the installation of the steering column 6*a* to the vehicle body.

Figure 7:
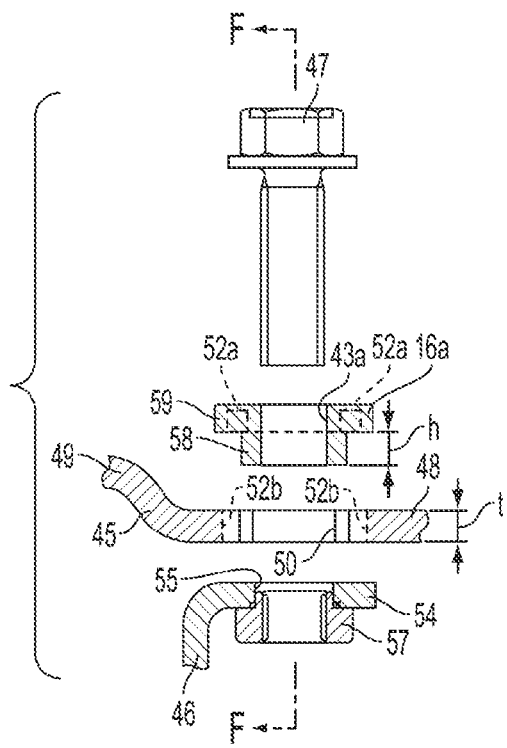
FIG. 7 is a cross-sectional view of section E-E in FIG. 4, and illustrates the state before the parts are assembled.
Figure 8:
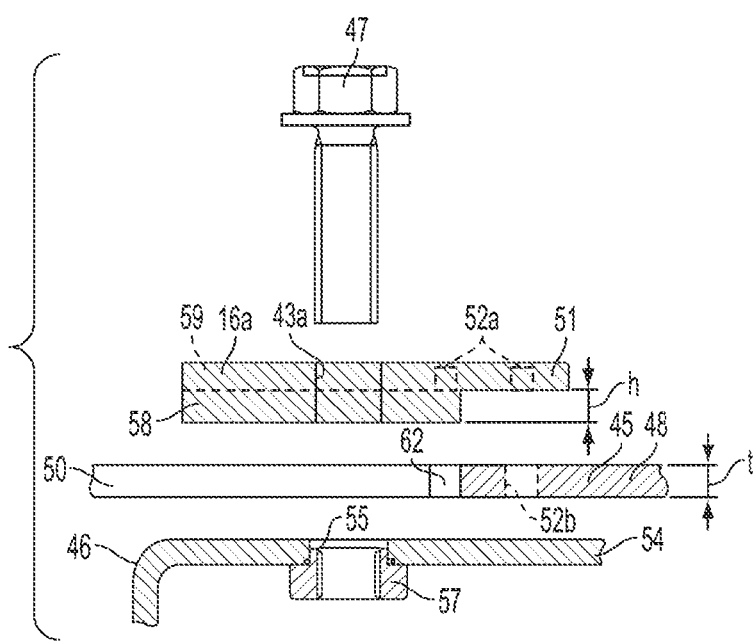
FIG. 8 is a cross-sectional view of section F-F in FIG. 7.

Furthermore, the support capsules 16*a* are such that they do not come out from the long holes 50 in the vertical direction, which is the thickness direction of the top plate 48. In order for this, in this embodiment, the width dimension in the left and right direction of the support capsules 16*a* is wide in the upper half and narrow in the lower half. In other words, the width dimension of the lower half of the support capsule 16*a* is a little less than the width dimension of the long hole 50, and this lower half functions as a guide section 58 that fits in the long hole 50 so that it can displace in the forward and backward direction of the long hole 50. On the other hand, the upper half of the support capsule 16*a* functions as a rim section 59 having a width dimension that is greater than the width dimension of the long hole 50. The height dimension h of the guide section 58 illustrated in FIG. 7 and FIG. 8 is a little greater than the thickness dimension t of the top plate 48 (h>t). Also, the rear end section of the rim section 59 protrudes further to the rear than the guide section 58. Part of the fastening hole 52*a* provided in each support capsule 16*a* is formed in the portion of the rear end section of the rim section 59 that protrudes further to the rear than the guide section 58.

With the support capsules 16*a* engaged to the rear end sections of the long holes 50, and with the bottom plate 54 of the dropping bracket 46 supported by the top plate 48 of the non-dropping bracket 45 via the support capsules 16*a* using the bolts 47 and nuts 57, the rim sections 59 and bottom plate 54 lie on portions of the top plate 48 located on the both sides of the long holes 50 and sandwich the portions in the thickness direction of the top plate 48. When an impact load is applied to the dropping bracket 46 by way of the steering column 6*a*, the support capsules 16*a* displace in the forward direction along the long holes 50, however, are in a state such that they do not come out of the long holes 50 in the thickness direction of the top plate 48.

When a vehicle, installed with the steering column support apparatus of this embodiment, constructed as described above, is in a collision accident, a large impact load is applied in the forward direction to the steering column 6*a* due to a secondary collision. As a result, a large force in the forward direction is applied to the support capsules 16*a* from the dropping bracket 46, which is supported in the middle section in the axial direction of the steering column 6*a*. A force is also applied in the shear direction to the fastening pins that join the support capsules 16*a* and the top plate 48, which causes these fastening pins 53 to shear. As a result, the support capsules 16*a* can displace in the forward direction with the respect to the non-dropping bracket 45 that is fastened as is to the vehicle body along the long holes 50 formed in the top plate 48.

Figure 2:
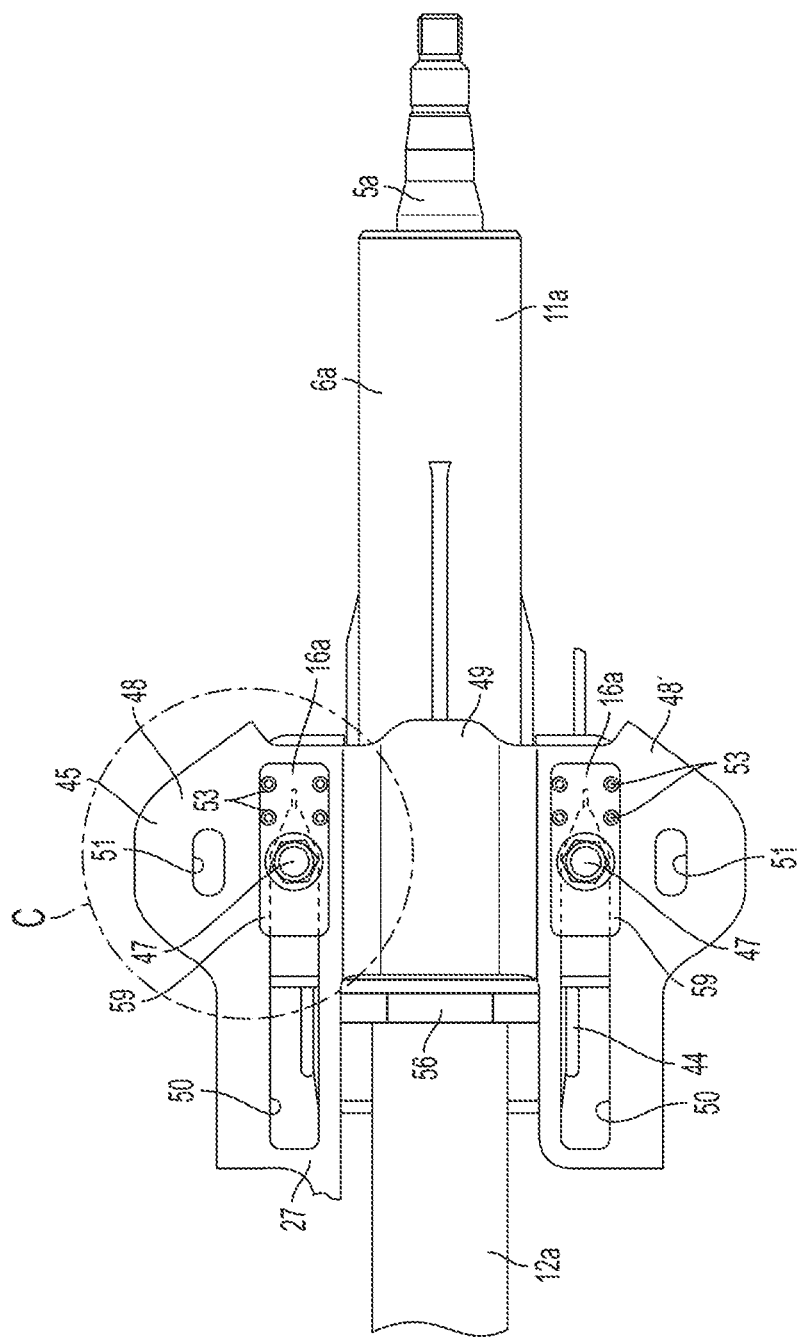
FIG. 2 is a top view of the center and right side portions of FIG. 1.
Figure 3:
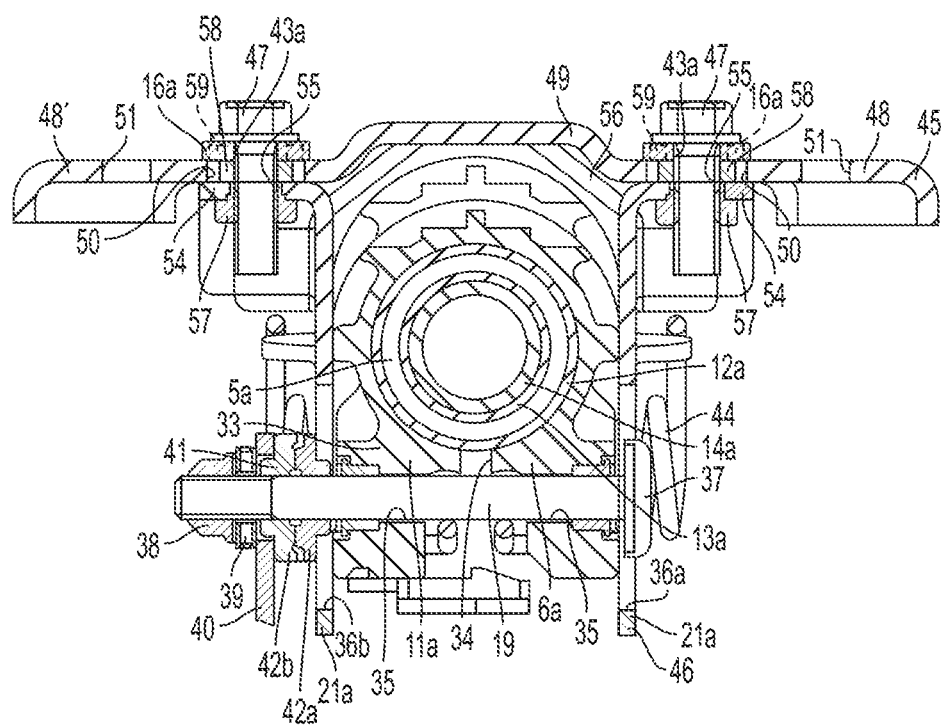
FIG. 3 is a cross-sectional view of section A-A in FIG. 1.
Figure 4:
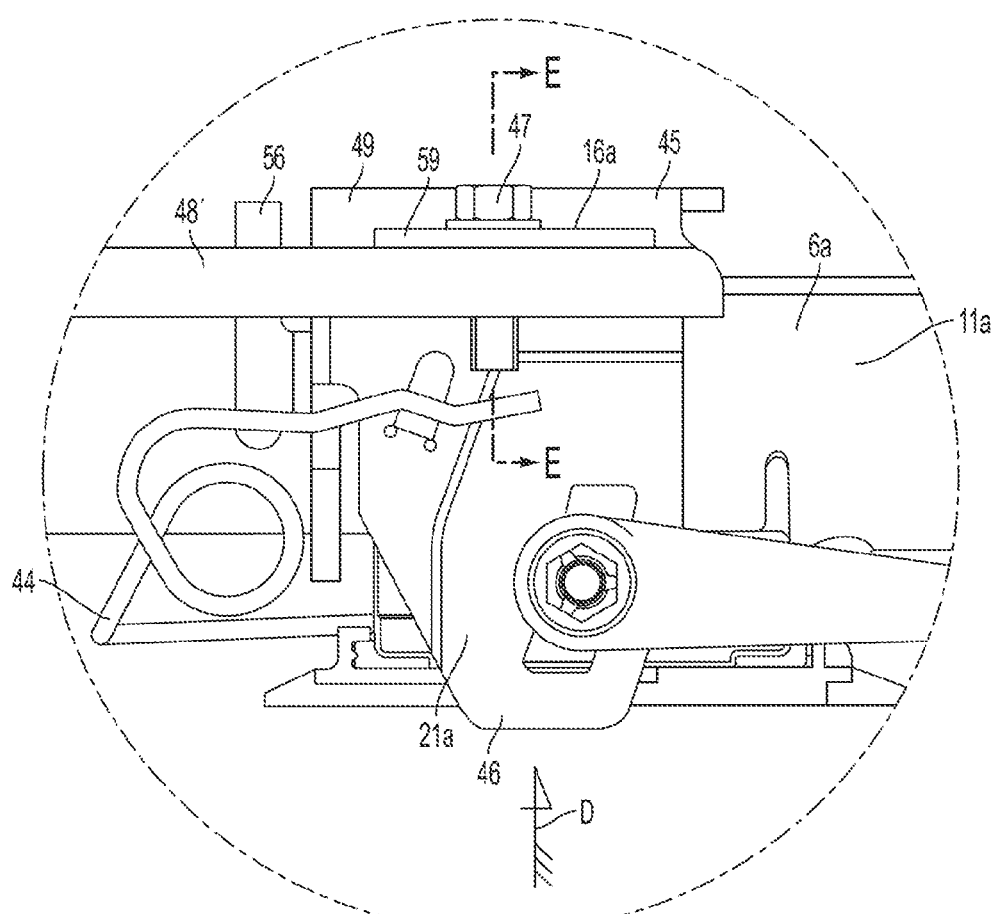
FIG. 4 is an enlarged view of portion B in FIG. 1.
Figure 5:
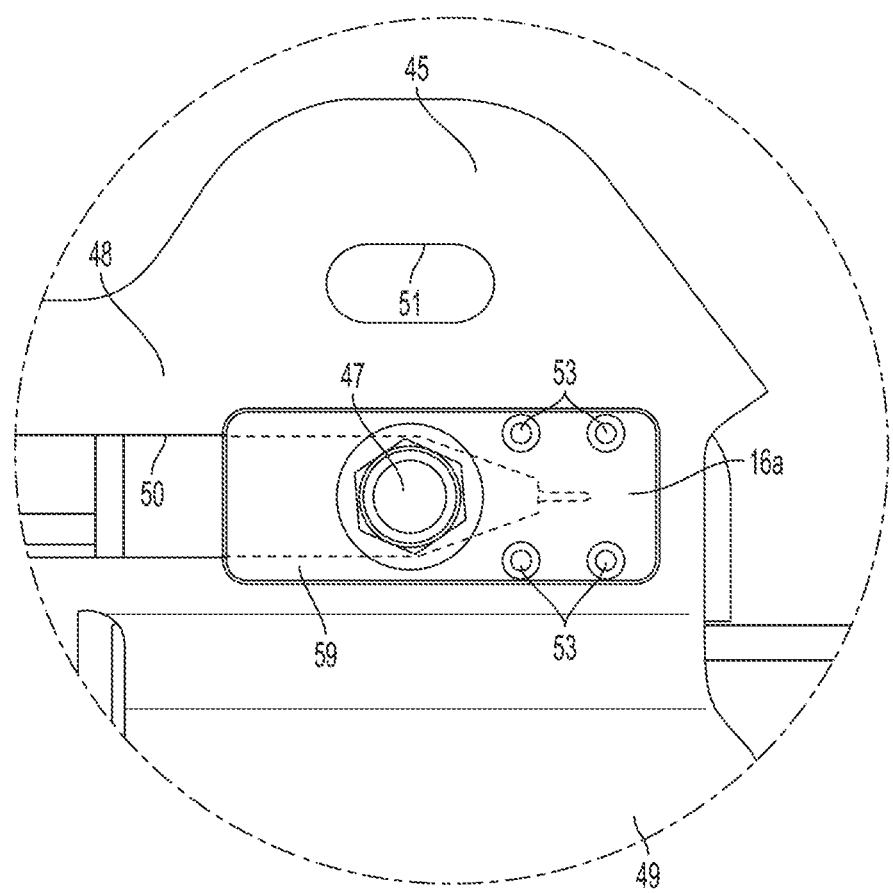
FIG. 5 is an enlarged view of portion C in FIG. 2.
Figure 6:
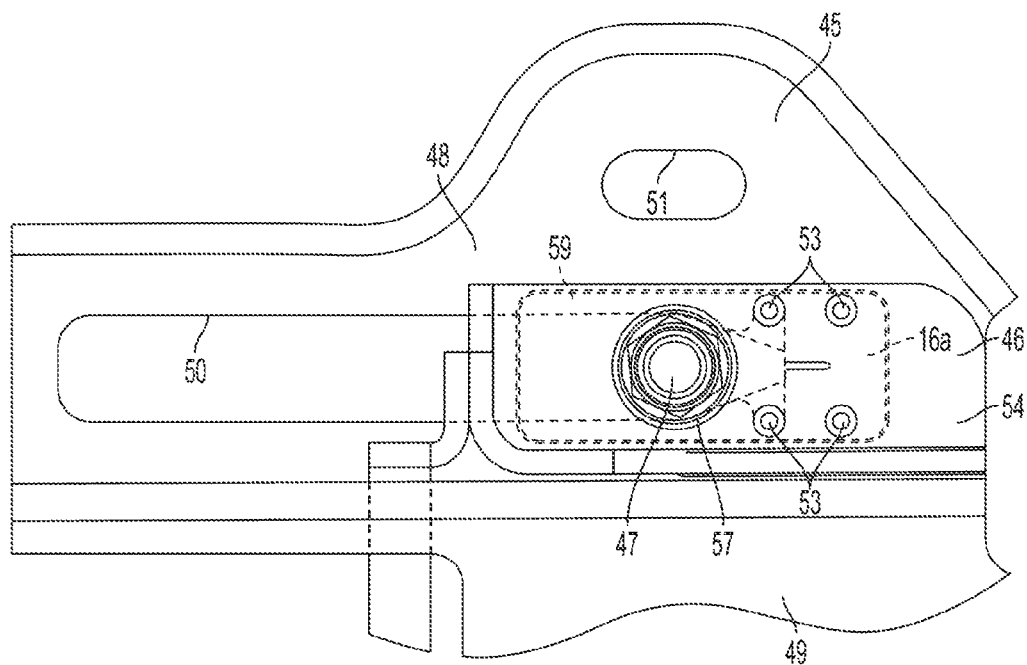
FIG. 6 is a view as seen in the direction of arrow D in FIG. 4.
Figure 9:
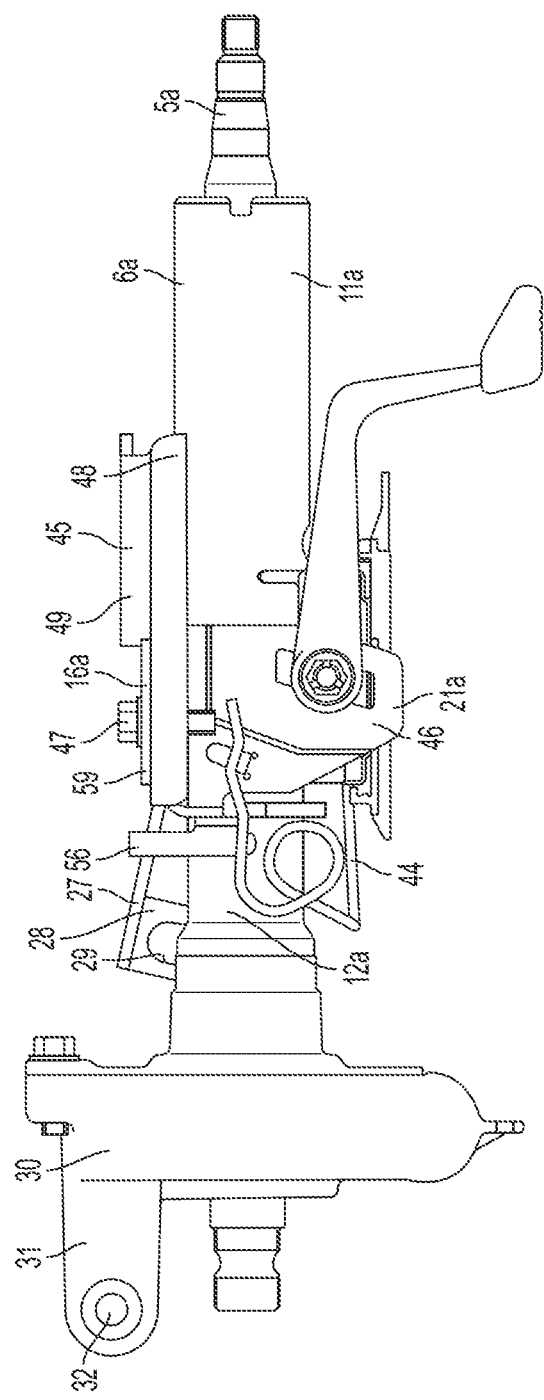
FIG. 9 is a side view of a first embodiment of the present invention, and illustrates the state after a secondary collision has occurred.
Figure 10:
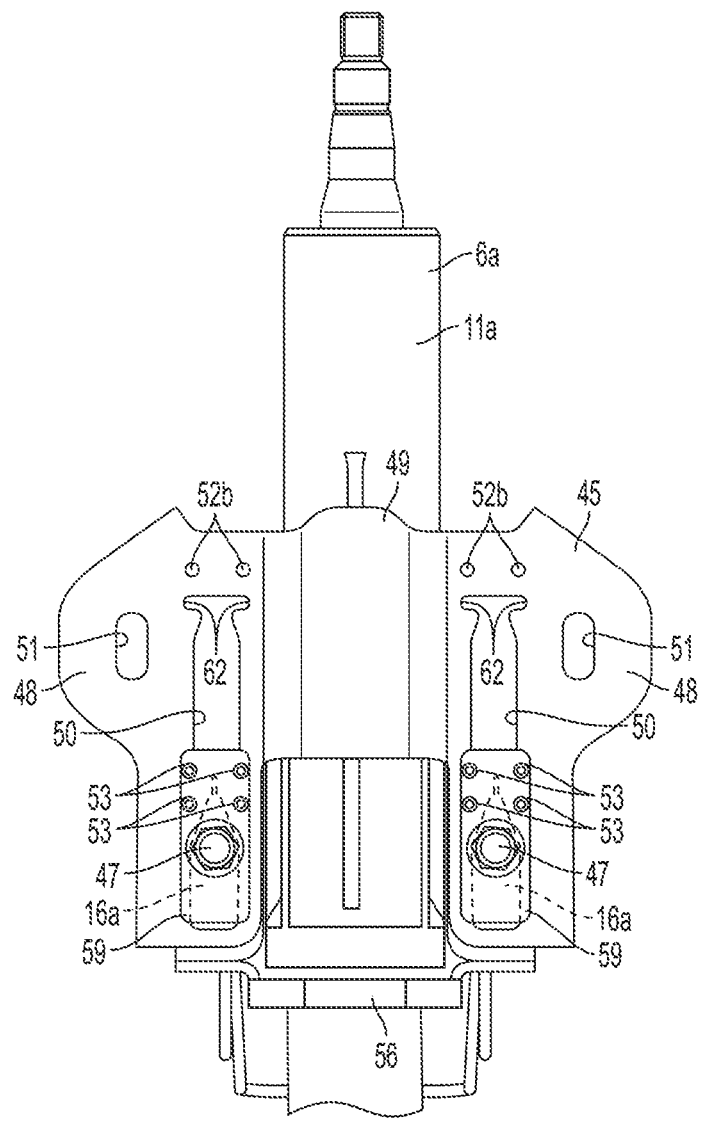
FIG. 10 is a top view of the center and right side portions in FIG. 9.

Together with the outer column 11*a* of the steering column 6*a*, the dropping bracket 46 displaces in the forward direction with respect to the non-dropping bracket 45 from the state illustrated in FIG. 1 and FIG. 2 to the state illustrated in FIG. 9 and FIG. 10. When the dropping bracket 46 displaces in the forward direction in this way, the support capsules 16*a* only displace in the forward direction along the long holes 50 and do not come out in either the downward or upward direction of the top plate 48. Therefore, even after the steering column 6*a* has absorbed the impact energy that is applied to the steering wheel 1 from the driver's body due to a secondary collision and displaces in the forward direction, the position of the height of the steering wheel 1 remains in a position such that it is easy to steer. Therefore, after a collision accident, the work of moving the vehicle out of the way and to the shoulder of the road under its own power or by pushing can be performed easily.

There is originally a support plate fastened to the vehicle body in the portion where the non-dropping bracket 45, which is necessary for obtaining the function and effect such as described above, is provided. In the case of providing a non-dropping bracket 45 in order to achieve the steering column support apparatus of this embodiment, by providing this non-dropping bracket 45 instead of the support plate, it is possible to keep the height within nearly the same height dimensions as in the case of the convention construction. Moreover, the height dimension (thickness) of this non-dropping bracket 45 itself is small, so even when the non-dropping bracket 45 is installed on the bottom surface of a support plate that is the same as that used in the conventional construction, the increase in the height dimension can be kept to a small amount. Therefore, with the steering column support apparatus of this embodiment attached to the vehicle body, the amount that the steering column 6*a* protrudes from underneath the dashboard can be kept to a minimum. Therefore, in addition to being able to increase the freedom of design for preventing interference between the steering column 6*a* and the driver's knees, it becomes easier to perform design for preventing injury to the driver due to the steering column 6*a* hitting the driver's knees during a collision accident.

Furthermore, each of the long holes 5 and support capsules 16*a* are located at positions on both the left and right sides of the steering column 6*a*, so it is possible to maintain support rigidity of the steering column 6*a* with respect to the force applied in a direction that causes the steering column 6*a* to tilt such as during a secondary collision. Therefore, during a secondary collision, displacement of the steering column 6*a* in the forward direction can be performed stably and reliably, and thus it is possible to completely protect the driver.

In the case of the construction of this embodiment, the support capsules 16*a* are installed so that during a secondary collision they displace in the forward direction in the pair of long holes 50 that are provided in the top plate 48. In other words, the support capsules 16a are not used in order to support the non-dropping bracket 45, which comprises the top plate 48, with respect to the vehicle body. Therefore, it is possible to make these support capsules 16a more compact than in the case of the conventional construction illustrated in FIG. 19 and FIG. 20. Moreover, the through holes 51 through which the bolts or the like are inserted for attaching the non-dropping bracket 45 to the vehicle body are provided separately from the long holes 50. Therefore, the existence of these through holes 51 does not limit the amount of displacement of the outer column 11a in the forward direction during a secondary collision. It is also possible to sufficiently increase the freedom of the location for these through holes 51. Furthermore, the fastening pins 53 are located further to the rear than the bolts 47 that connect the non-dropping bracket 45 and the dropping bracket 46. Therefore, even when a force is applied at an angle to the outer column 11a during a secondary collision, the bolts 47 can effectively apply a tensile force from the bolts 47 to the support capsules 16a that pull the support capsules 16a in the forward direction. As a result, a shearing force is applied to the fastening pins 53, and the outer column 11a is caused to displace in the forward direction.

Embodiment 2

Figure 11:
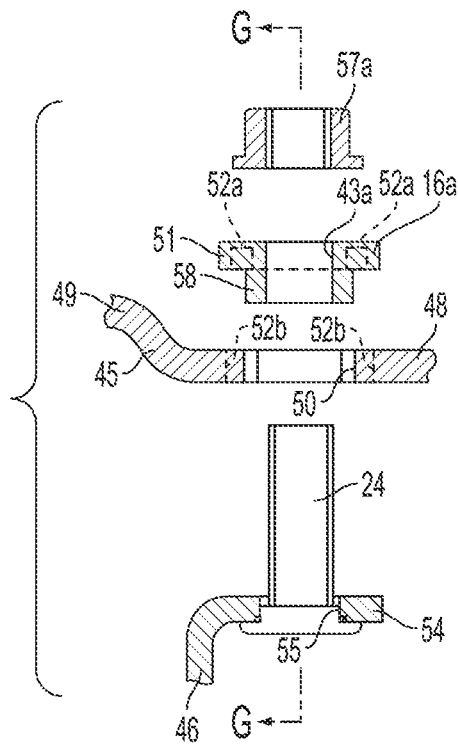
FIG. 11 is a cross-sectional view similar to FIG. 7, and illustrates a second embodiment of the present invention.
Figure 12:
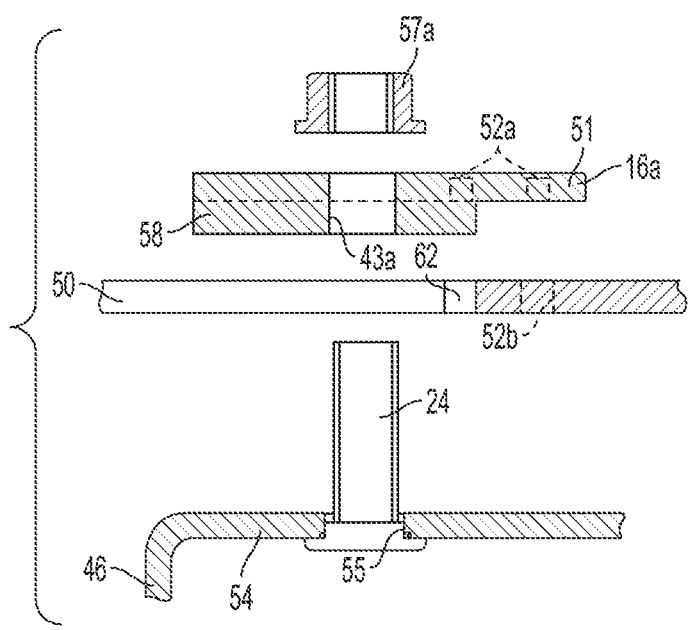
FIG. 12 is a cross-sectional view of section G-G in FIG. 11.

FIG. 11 and FIG. 12 illustrate a second embodiment of the present invention. In this embodiment, studs 24 are used as the connection members for connecting and fastening the dropping bracket 46 to the support capsules 16a. The bottom end section of this stud 24 is fastened to and supported by the installation hole 55 section of the bottom plate section 54 of the dropping bracket 46, with the stud 24 being inserted through this installation hole 55 from the bottom to the top. Furthermore, with the stud 24 being inserted through the through hole 43a in the support capsule 16a from the bottom to the top, the portion on the top end section of the stud 24 that protrudes upward further than the top surface of the support capsule 16a is screwed into a nut 57a and tightened. The construction and function of other parts are the same as in the case of the first embodiment, so drawings and explanations of identical parts are omitted.

Embodiment 3

Figure 13:
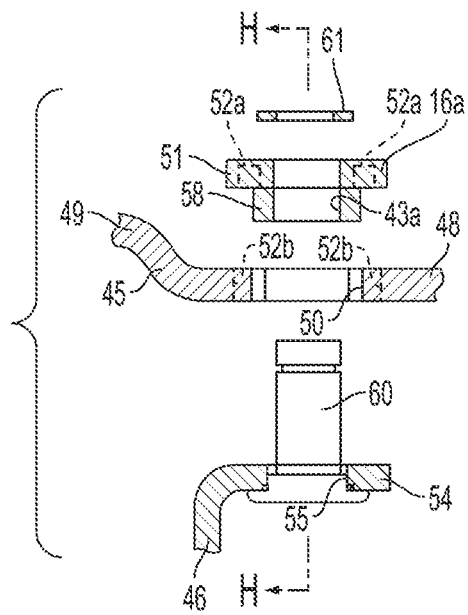
FIG. 13 is a cross-sectional view similar to FIG. 7, and illustrates a third embodiment of the present invention.
Figure 14:
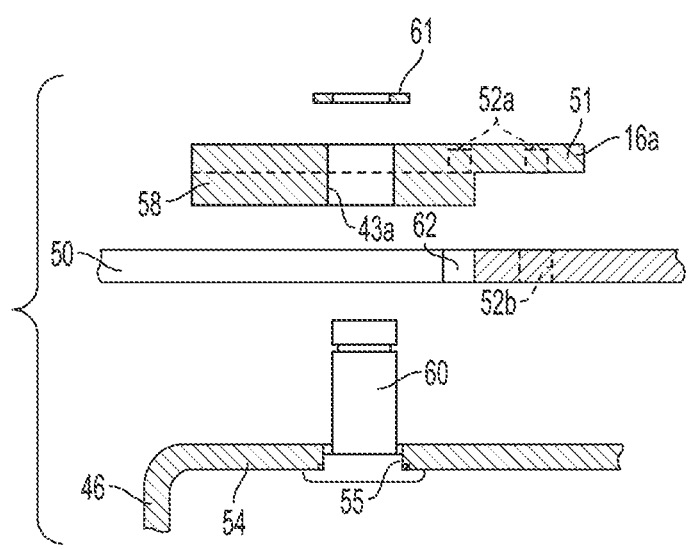
FIG. 14 is a cross-sectional view of section H-H in FIG. 13.

FIG. 13 and FIG. 14 illustrate a third embodiment of the present invention. In this embodiment, connection pins 60 are used as the connection members for connecting and fastening the dropping bracket 46 to the support capsules 16a. A retaining ring 61 is fastened to the portion on the top end section of the connection pin 60 that protrudes upward further than the top surface of the support capsule 16a. Except for using a connection pin 60 instead of a stud 24 and a retaining ring 61 instead of a nut 57a, this embodiment is the same as the second embodiment, so any redundant explanation is omitted.

Embodiment 4

Figure 15:
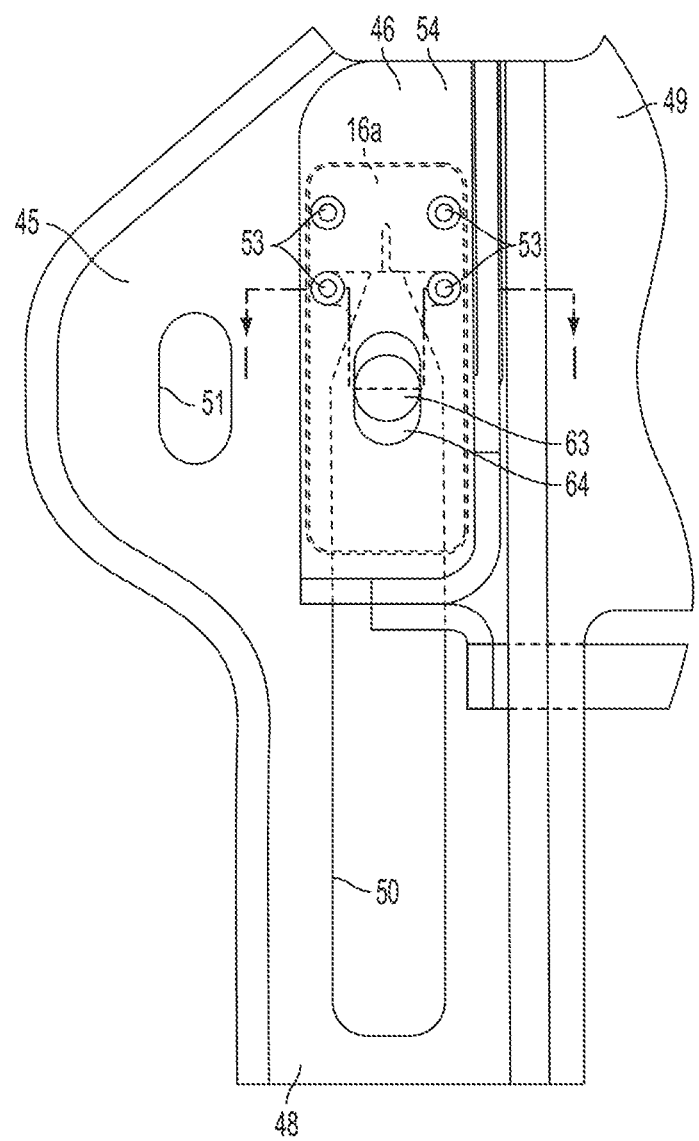
FIG. 15 is a view similar to FIG. 6, and illustrates a fourth embodiment of the present invention.
Figure 16:
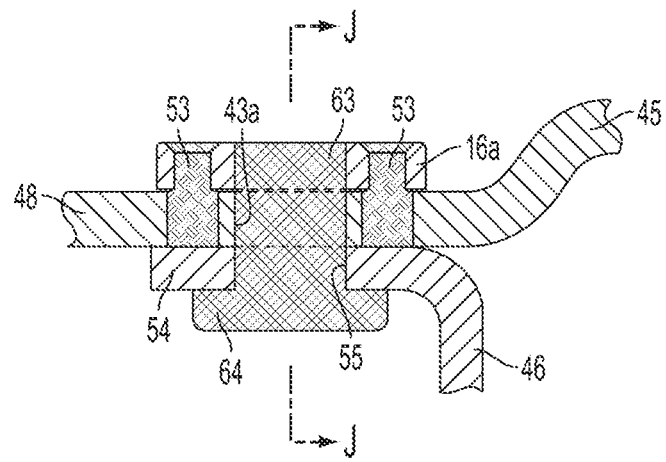
FIG. 16 is a cross-sectional view of section I-I in FIG. 15.
Figure 17:
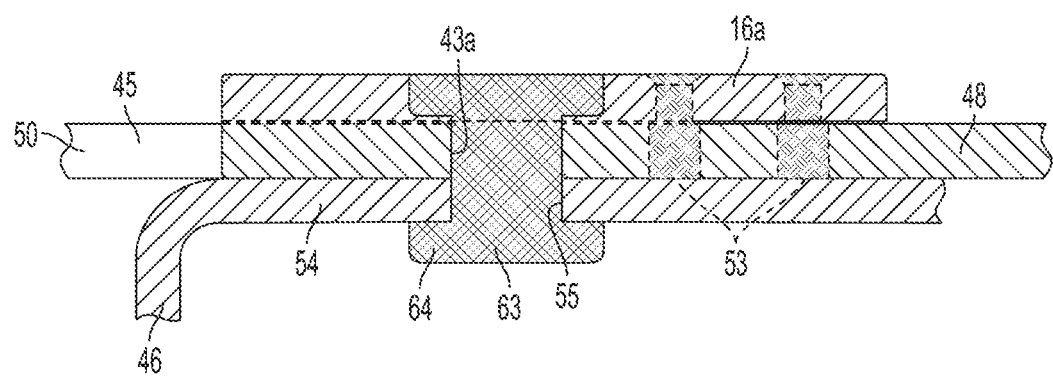
FIG. 17 is a cross-sectional view of section J-J in FIG. 16.

FIG. 15 to FIG. 17 illustrate a fourth embodiment of the present invention. In this embodiment, synthetic resin column shaped members 63 are used as the connection members for connecting and fastening the dropping bracket 46 to the support capsules 16a. This column shaped member 63 is formed by performing injection molding inside the installation hole 55 that is formed in the bottom plate 54 of the dropping bracket 46 and the through hole 43a in the support capsule 16a such that the connection member spans between the installation hole 55 and the through hole 43a. Moreover, the cross-sectional area of the portion on the upper side of the through hole is greater than the cross-sectional area of the portion on the lower side, and forms an outward facing flange shaped second rim section 64 in the portion on the lower end section of the column shaped member 63 that protrudes further than the bottom surface of the bottom plate 54. The top side and bottom side of the top plate 48 of the non-dropping bracket 45 are held between this second rim section 64 and the top section of the column shaped member 63 that is inside the upper portion of the through hole 43a. The construction and function of the other parts are the same as those in the first embodiment, so drawings and explanation for identical parts are omitted.

Embodiment 5

In the fourth embodiment, the support capsule 16a was made of a light alloy, and the fastening pins 53 and column shaped member 63 are made of a synthetic resin. However, it is possible for the support capsule 16a to be made of a synthetic resin, and to integrate the support capsule 16a, the fastening pins 53 and the column shaped member 63. In other words, by setting the portion of the top plate 48 of the non-dropping bracket 45 that is near the rear end section of the long hole 50, and the bottom plate 54 of the dropping bracket 46 inside an injection molding cavity, and then feeding synthetic resin into this cavity, the support capsule 16a is formed by injection molding (insert molding) together with the fastening pins 53 and column shaped member 63. The shape after completion is the same as that illustrated in FIG. 15 to FIG. 17 except that the support capsule 16a, the fastening pins 53 and the column shaped member 63 are integrated.

INDUSTRIAL APPLICABILITY

The intent of the present invention is to keep the position of the steering wheel from becoming unstable even in a state after the steering wheel has displaced in the forward direction due to a secondary collision. Therefore, as illustrated in the figures, without being limited to a tilting and telescoping mechanism, the present invention can be applied to a steering apparatus that comprises just a tilting mechanism or just a telescoping mechanism, and furthermore can be applied to a steering apparatus that does not comprise either of these.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint
10 Electric motor
11, 11a Outer column
12, 12a Inner column
13, 13a Outer shaft
14, 14a Inner shaft
15 Vehicle body
16, 16a Support capsule
17 Bolt 18 Support bracket
19 Tilt rod
20 Top plate
21, 21', 21a Side plate
22 Installation plate
23 Cut out section
24 Stud
25 Installation grooves
26a, 26b Small through hole
27 Connecting arm section
28 Installation plate
29 Fastening hole
30 Reduction gear casing
31 Support arm
32 Horizontal shaft
33 Held section
34 Slit section
35 Long telescopic hole
36a, 36b Long tilt hole
37 Rim section
38 Nut
39 Thrust bearing
40 Adjustment lever
41 Cam mechanism
42a, 42b Cam plate element
43, 43a Through hole
44 Balance spring
45 Non-dropping bracket
46 Dropping bracket
47 Bolt
48, 48' Top plate
49 Connection plate
50 Long hole
51 Through hole
52a, 52b Fastening holes
53 Fastening pin
54 Bottom plate
55 Installation hole
56 Connection section
57, 57a Nut
58 Guide section
59 Rim section
60 Connection pin
61 Retaining ring
62 Concave section
63 Column shaped member
64 Second rim section

What is claimed is:

1. A steering column support apparatus, comprising:
a non-dropping bracket that is fastened to and supported by a vehicle body and located on the upper part of the middle section in the axial direction of a steering column, and that comprises a top plate that is provided in the axial direction of the steering column, and a pair of long holes formed in part of the top plate such that the long holes are parallel to each other, and extend in the axial direction of the steering column;
a dropping bracket that is supported by the middle section in the axial direction of the steering column, and that comprises a bottom plate whose top surface faces the bottom surface of the top plate of the non-dropping bracket, and a pair of installation holes that are formed in part of the bottom plate in locations that are aligned with the rear end sections of the long holes;
a pair of support capsules that are fastened to the non-dropping bracket in the rear end sections of the long holes in the non-dropping bracket, and that comprise through holes that penetrate in the vertical direction, the support capsules being capable of displacing in the forward direction along the long holes due to an impact load in the forward direction that is applied to these support capsules, and the support capsules are being arranged such that the capsules do not come out from the long holes in the thickness direction of the top plate of the non-dropping bracket; and
a pair of connection members that connect the dropping bracket to the support capsules by being inserted into the installation holes in the dropping bracket and into the through holes in the support capsules.

2. The steering column support apparatus according to claim 1, wherein
the support capsules comprise: a guide section having a width dimension that is a little smaller than the width dimension of the long holes, and a rim section that is located on the top portion of the guide section having a width dimension that is larger than the width dimension of the long holes; wherein
by locating the guide section inside the long hole, and locating the rim section and the bottom plate on both side sections of the long hole in the top plate in thickness direction of the top plate, the support capsules can displace along the long holes, and the support capsules do not come out from the long holes in the width direction of the top plate.

3. The steering column support apparatus according to claim 2, wherein
the connection member comprises a bolt that is inserted from top to bottom through the through hole and installation hole, and a nut that is located on the bottom surface of the bottom plate and that screws onto the bolt.

4. The steering column support apparatus according to claim 2, wherein
the connection member comprises a stud that is inserted from bottom to top through the installation hole and through hole, the bottom end section thereof being supported by the bottom surface of the bottom plate, and the top end section protruding upward further than the top surface of the support capsule, and a nut that screws onto the top end section of the stud.

5. The steering column support apparatus according to claim 2, wherein
the connection member comprises a connection pin that is inserted from bottom to top through the installation hole and through hole, the bottom end section thereof being supported by the bottom surface of the bottom plate, and the top end section protruding upward further than the top surface of the support capsule, and a retaining ring that is fastened to the top end section of the connection pin.

6. The steering column support apparatus according to claim 1, further comprising
fastening pins that are located such that the fastening pins span fastening holes that are formed in positions on the support capsule and on the top plate of the non-dropping bracket, and are such that the fastening pins can be sheared by an impact load in the shear direction.

7. A steering column support apparatus, comprising:
a non-dropping bracket that is fastened to and supported by a vehicle body and located on, the upper part of the middle section in the axial direction of a steering column, and that comprises a top plate that is provided in the axial direction of the steering column, and a pair of long holes formed in part of the top plate such that the long holes are parallel to each other, and extend in the axial direction of the steering column;

a dropping bracket that is supported by the middle section in the axial direction of the steering column, and that comprises a bottom plate whose top surface faces the bottom surface of the top plate of the non-dropping bracket, and a pair of installation holes that are formed in part of the bottom plate in locations that are aligned with the rear end sections of the long holes;

a pair of support capsules that are fastened to the non-dropping bracket in the rear end sections of the long holes in the non-dropping bracket, and that comprise through holes that penetrate in the vertical direction, the support capsules being capable of displacing in the forward direction along the long holes due to an impact load in the forward direction that is applied to these support capsules, and the support capsules are being arranged such that the capsules do not come out from the long holes in the thickness direction of the top plate of the non-dropping bracket; and a pair of connection members that connect the dropping bracket to the support capsules by being inserted into the installation holes in the dropping bracket and into the through holes in the support capsules;

wherein the support capsules comprise
a guide section having a width dimension that is a little smaller than the width dimension of the long holes, and
a rim section that is located on the top portion of the guide section having a width dimension that is larger than the width dimension of the long holes;

wherein the height dimension of the guide section is a little greater than the thickness dimension of the top plate; and wherein by locating the guide section inside the long hole, and locating the rim section and the bottom plate on both side sections of the long hole in the top plate in thickness direction of the top plate, the support capsules can displace along the long holes, and the support capsules do not come out from the long holes in the width direction of the top plate.

8. The steering column support apparatus according to claim 7, wherein
the connection member comprises a bolt that is inserted from top to bottom through the through hole and installation hole, and a nut that is located on the bottom surface of the bottom plate and that screws onto the bolt.

9. The steering column support apparatus according to claim 7, wherein
the connection member comprises a stud that is inserted from bottom to top through the installation hole and through hole, the bottom end section thereof being supported by the bottom surface of the bottom plate, and the top end section protruding upward further than the top surface of the support capsule, and a nut that screws onto the top end section of the stud.

10. The steering column support apparatus according to claim 7, wherein
the connection member comprises a connection pin that is inserted from bottom to top through the installation hole and through hole, the bottom end section thereof being supported by the bottom surface of the bottom plate, and the top end section protruding upward further than the top surface of the support capsule, and a retaining ring that is fastened to the top end section of the connection pin.

11. The steering column according to claim 7, wherein
the through hole of the support capsule is constructed such that the cross-sectional area of the upper portion is greater than the cross-sectional area of the lower portion;
the connection member is a column shaped member that is formed by injection molding of synthetic resin in the installation hole and through hole such that the column shaped member spans the installation hole and through hole; and
an outward facing flange second rim section is formed on the bottom end section of the column shaped member in the portion that protrudes further downward than the bottom surface of the bottom plate, and the top plate is held between this second flange section and the portion on the top end section of the column shaped member that is inside the upper portion of the through hole.

12. The steering column support apparatus according to claim 7, further comprising
fastening pins that are located such that the fastening pins span fastening holes that are formed in positions on the support capsule and on the top plate of the non-dropping bracket, and are such that the fastening pins can be sheared by an impact load in the shear direction.

13. The steering column support according to claim 12, wherein
the support capsules are made of synthetic resin, and these support capsules are integrated with the fastening pins through injection molding.

14. The steering column support according to claim 12, wherein
the support capsules are made of synthetic resin, and these support capsules are integrated with the fastening pins through injection molding.

15. A steering column support apparatus, the apparatus comprising:
a non-dropping bracket that is fastened to and supported by a vehicle body and located on the upper part of the middle section in the axial direction of a steering column, and that comprises a top plate that is provided in the axial direction of the steering column, and a pair of long holes formed in part of the top plate such that the long holes are parallel to each other, and extend in the axial direction of the steering column;

a dropping bracket that is supported by the middle section in the axial direction of the steering column, and that comprises a bottom plate whose top surface faces the bottom surface of the top plate of the non-dropping bracket, and a pair of installation holes that are formed in part of the bottom plate in locations that are aligned with the rear end sections of the long holes;

a pair of support capsules that are fastened to the non-dropping bracket in the rear end sections of the long holes in the non-dropping bracket, and that comprise through holes that penetrate in the vertical direction, the support capsules being capable of displacing in the forward direction along the long holes due to an impact load in the forward direction that is applied to these support capsules, and the support capsules are being arranged such that the capsules do not come out from the long holes in the thickness direction of the top plate of the non-dropping bracket; and a pair of connection members that connect the dropping bracket to the support capsules by being inserted into the installation holes in the dropping bracket and into the through holes in the support capsules;

wherein the support capsules comprise
- a guide section having a width dimension that is a little smaller than the width dimension of the long holes, and
- a rim section that is located on the top portion of the guide section having a width dimension that is larger than the width dimension of the long holes;

wherein by locating the guide section inside the long hole, and locating the rim section and the bottom plate on both side sections of the long hole in the top plate in thickness direction of the top plate, the support capsules can displace along the long holes, and the support capsules do not come out from the long holes in the width direction of the top plate;

wherein the through hole of the support capsule is constructed such that the cross-sectional area of the upper portion is greater than the cross-sectional area of the lower portion;

wherein the connection member is a column shaped member that is formed by injection molding of synthetic resin in the installation hole and through hole such that the column shaped member spans the installation hole and through hole; and wherein an outward facing flange second rim section is formed on the bottom end section of the column shaped member in the portion that protrudes further downward than the bottom surface of the bottom plate, and the top plate is held between this second flange section and the portion on the top end section of the column shaped member that is inside the upper portion of the through hole.

16. The steering column support apparatus according to claim 15, further comprising
- fastening pins that are located such that the fastening pins span fastening holes that are formed in positions on the support capsule and on the top plate of the non-dropping bracket, and are such that the fastening pins can be sheared by an impact load in the shear direction.

17. The steering column support according to claim 16, wherein
- the support capsules are made of synthetic resin, and these support capsules are integrated with the fastening pins through injection molding.

* * * * *